US006587445B1

United States Patent
Mimura

(10) Patent No.: US 6,587,445 B1
(45) Date of Patent: Jul. 1, 2003

(54) CELLULAR RADIO SYSTEM ALLOWING MOBILE STATION TO PERFORM COMMUNICATION THROUGH BASE STATION TO WHICH MOBILE STATION IS CONNECTED OVER CDMA RADIO CHANNEL, AND BASE STATION APPARATUS AND MOBILE STATION APPARATUS WHICH ARE USED FOR CELLULAR RADIO SYSTEM

(75) Inventor: Masahiko Mimura, Hino (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/230,094

(22) PCT Filed: May 20, 1998

(86) PCT No.: PCT/JP98/02212

§ 371 (c)(1),
(2), (4) Date: Jan. 20, 1999

(87) PCT Pub. No.: WO98/53631

PCT Pub. Date: Nov. 26, 1998

(30) Foreign Application Priority Data

May 21, 1997 (JP) ............................................. 9-131015

(51) Int. Cl.[7] .............................................. H04Q 7/00
(52) U.S. Cl. ..................................... 370/331; 455/432
(58) Field of Search ................................ 370/320, 329, 370/331, 335, 342, 441, 431; 455/432, 436, 437, 439, 442

(56) References Cited

U.S. PATENT DOCUMENTS

| | | | |
|---|---|---|---|
| 5,327,577 A | 7/1994 | Uddenfeldt | 455/33.2 |
| 5,640,675 A | 6/1997 | Pinault et al. | 455/33.1 |
| 6,021,123 A | * 2/2000 | Mimura | 370/331 |

FOREIGN PATENT DOCUMENTS

| | | |
|---|---|---|
| EP | 0 566 551 A2 | 10/1993 |
| EP | 0 721 291 A1 | 7/1996 |
| EP | WO 97/13334 | 4/1997 |
| JP | 62-92529 | 4/1987 |
| JP | 63-226133 | 9/1988 |
| JP | 4-32322 | 2/1992 |
| JP | 4-37324 | 2/1992 |
| JP | 4-72828 | 3/1992 |
| JP | 4-91522 | 3/1992 |
| JP | 4-124920 | 4/1992 |
| JP | 4-185026 | 7/1992 |
| JP | 4-322521 | 11/1992 |
| JP | 4-323921 | 11/1992 |
| JP | 4-373324 | 12/1992 |
| JP | 6-501145 | 2/1994 |
| JP | 6-197097 | 7/1994 |
| JP | 7-203531 | 8/1994 |
| JP | 8-33033 | 2/1996 |
| WO | WO 97/00585 | 1/1997 |

* cited by examiner

*Primary Examiner*—Wellington Chin
*Assistant Examiner*—Brenda Pham
(74) *Attorney, Agent, or Firm*—Finnegan, Henderson, Farabow, Garrett & Dunner, L.L.P.

(57) ABSTRACT

A CPU (42a) in each base station (BS) monitors the channel occupancy of each of a plurality of radio frequencies allocated to the base station (BS).

When the difference between the channel occupancies of a plurality of radio frequencies allocated to a single base station (BS) becomes a predetermined state, the CPU (42a) switches the radio frequency as a candidate to be used by a predetermined base station (BS) of mobile stations (BS) that are present in the cell formed by the base station (BS) and set in the standby state to a radio frequency whose channel occupancy is in a predetermined state.

1 Claim, 12 Drawing Sheets

CELLULAR RADIO SYSTEM ALLOWING MOBILE STATION TO PERFORM COMMUNICATION THROUGH BASE STATION TO WHICH MOBILE STATION IS CONNECTED OVER CDMA RADIO CHANNEL, AND BASE STATION APPARATUS AND MOBILE STATION APPARATUS WHICH ARE USED FOR CELLULAR RADIO SYSTEM

TECHNICAL FIELD

The present invention relates to a cellular radio system such as a car/portable telephone system and a cordless telephone system and, more particularly, to a cellular radio system using a code division multiple access (CDMA) scheme as a radio access scheme between a base station and a mobile station, and a base station apparatus and mobile station apparatus which are used for the cellular radio system.

BACKGROUND ART

A spread spectrum communication scheme, which is robust against interference and disturbance, has gained a great deal of attention as one of communication schemes used for a mobile communication system. The spread spectrum communication scheme is mainly used to implement a cellular radio system using CDMA scheme.

In the cellular radio system using CDMA scheme, for example, the transmitting apparatus modulates digital speech data or digital image data by a digital modulation scheme such as PSK. This modulated transmission data is then converted into a broadband baseband signal by using a spreading code such as a pseudorandom noise code (PN code). This baseband signal is up-converted into a signal in the radio frequency band and is then transmitted. The receiving apparatus down-converts the received signal in the radio frequency band into a signal having an intermediate or baseband frequency. The apparatus then de-spreads this down-converted signal by using the same spreading code as that used by the transmitting apparatus. Digital demodulation is then performed for the de-spread signal by a digital demodulation scheme such as PSK, thereby reconstructing data from the received data.

That is, in CDMA scheme, different spreading codes are assigned to radio communications between a plurality of mobile station apparatuses and base stations to ensure channel separation between the respective radio communications.

FIG. 14 shows the schematic arrangement of a CDMA cellular radio system. Referring to FIG. 14, a plurality of base stations BS1 to BSn are distributed in a service area. These base stations BS1 to BSn are respectively connected to a control station CS through wire lines L1 to Ln. The base stations BS1 to BSn are further connected to a wire network NW through the control station CS. The base stations BS1 to BSn respectively form radio zones Z1 to Zn called cells. Mobile stations MS1 to MSm are respectively connected to base stations BS in the cells where the respective mobile stations are present by CDMA scheme over radio paths.

In a system of this type, when any one of the mobile stations MS1 to MSm moves between cells during communication, handoff, i.e., the switching of the base station to another to which radio path is to be connected is performed. There are two types of handoff: soft handoff and hard handoff.

Soft handoff is unique to a CDMA cellular radio system. The perform handoff, a mobile station has two radio paths at the same time. One of the radio paths connects the mobile station to the source base station with which it has been communicating. The other radio path connects the mobile station to the destination base station with which it will communicate. The mobile station then performs path diversity synthesis, by using the signals it receives over these radio paths. Thereafter, of the paths under path diversity synthesis, a path on which the reception electric field strength of a pilot channel has dropped below a threshold for a predetermined period of time or more is disconnected, thereby switching the base stations to which the mobile station is connected. As described above, in a soft handoff, one of two paths is always connected to a base station at the time of handoff, and hence no path disconnection occurs. An advantage of soft handoff is that switching can be smoothly performed without any short break in speech.

Soft handoff, however, requires both the source and destination base stations to use the same radio frequency. For this reason, for example, as shown in FIG. 14, in a system in which different radio frequencies f1, f2, and f3 are allocated to a plurality of base station groups BSa, BSb, and BSc, when a mobile station MSi moves from a cell of the base station group Bsa to a cell of another base station group BSb or BSc, soft handoff cannot be performed.

In contrast to this, hard handoff is mainly performed when the above source and destination base stations use different frequencies. More specifically, when a mobile station must change the radio frequency in use at the time of handoff, a message for instructing handoff is sent from a base station to the mobile station. Upon reception of this message, the mobile station temporarily stops transmission/reception and forms a new radio path allocated by the base station between itself and the base station. After this radio path is formed, the mobile station resumes transmission/reception by using the path. In a hard handoff, the radio path is temporarily disconnected to switch the radio frequencies, and a radio path must be formed again by using a new radio frequency.

In such a system, a plurality of radio frequencies may be allocated to the respective base station groups, and the respective base stations may use CDMA scheme with the respective radio frequencies, thereby increasing the number of traffic channels.

In this case, however, the occupancies of the traffic channels having the respective radio frequencies in the respective base stations may become uneven. Assume that the occupancies of the traffic channels having the respective radio frequencies become uneven. In this case, if an originating mobile station selects a radio frequency with dense traffic, the base station may be found busy in spite of the presence of an available channel, resulting in blocked communication. Assume also that a mobile station selects a radio frequency with dense traffic in a hard or soft handoff. In this case, even if an available channel is present, it takes a long period of time to form a radio path again. As a result, speech communication may be interrupted or noise may be produced, deteriorating the speech communication quality. Alternatively, the call may be dropped due to a handoff failure.

DISCLOSURE OF INVENTION

It is an object of the present invention to provide a cellular radio system which can average the traffic channel occupancies of the respective radio frequencies, thereby allowing effective use of traffic channels.

In order to achieve the above object, according to the present invention, in a cellular radio system including a plurality of base stations respectively belonging to a plurality of base station groups and forming cells having a predetermined diameter, and mobile stations connected to the base stations over CDMA radio channels, each of the base stations using CDMA radio channels of a plurality of radio frequencies allocated to the base station group to which the base station belongs, the channel occupancies of a plurality of radio frequencies allocated to each of the plurality of base stations are monitored by a channel occupancy monitoring means.

When the difference between the channel occupancies of the respective radio frequencies allocated to the same base station, determined by the channel occupancy monitoring means, becomes a predetermined state, the radio frequency as a candidate to be used by a predetermined mobile station of mobile stations that are present in the cell formed by the base station and set in the standby state is switched to the radio frequency whose channel occupancy determined by the channel occupancy monitoring means is in a predetermined state.

Consequently, as radio frequencies to be used by mobile stations in the standby state to newly start communications, radio frequencies whose channel occupancies are in a predetermined state are properly distributed at random, thereby averaging the channel occupancies of the respective radio frequencies.

In addition, according to the present invention, a frequency use state notifying means generates frequency use state information for notifying the mobile station of the use state of each radio frequency on the basis of the channel occupancies determined by the channel occupancy monitoring means, and transmits the information to the mobile station. The mobile station forms a radio frequency list in which priority levels are assigned to a plurality of radio frequencies on the basis of the frequency use state information before power-off, and stores it in a power-off state. Immediately after power-on of the mobile station, a search is performed to check in the order of priority levels whether the radio frequencies indicated by the radio frequency list stored in the storage means can be used, and the first detected radio frequency that can be used is as a candidate radio frequency to be used.

Consequently, as radio frequencies to be used by mobile stations in the standby state to newly start communications, radio frequencies are properly distributed at random on the basis of the use state of each radio frequency before power-off, thereby averaging the channel occupancies of the respective radio frequencies.

When the mobile station moves to a new cell formed by another base station belonging to the same base station group to which the base station forming an old cell in which the mobile station has been present belongs, it is checked, on the basis of the channel occupancy determined by the channel occupancy monitoring means with respect to the base station forming the new cell, whether the channel occupancy of the radio frequency in the new cell, which has been used by the mobile station in the old cell, is not less than a predetermined value. Soft handoff is determined if the channel occupancy of the radio frequency in the new cell, which has been used by the mobile station in the old cell, is less than predetermined value. Hard handoff is determined if the channel occupancy of the radio frequency in the new cell, which has been used by the mobile station in the old cell, is not less than predetermined value. When hard handoff is to be performed, a radio frequency whose channel occupancy is not more than a predetermined value in the new cell is used in the mobile station.

Consequently, as radio frequencies to be used after mobile handoff, radio frequencies whose channel occupancies are not more than the predetermined value in new cells are properly distributed at random, thereby averaging the channel occupancies of the respective radio frequencies.

BRIEF DESCRIPTION OF DRAWINGS

FIG. 4 is a flow chart showing a control procedure for idle handoff control in a CPU 42a;

FIG. 8 is a flow chart showing a control procedure for idle handoff control in a CPU 13a;

FIG. 9 is a flow chart showing a control procedure for control at power-off in the CPU 13a;

FIG. 10 is a flow chart showing a control procedure for start-up control in the CPU 13a;

FIG. 11 is a flow chart showing a control procedure for mobile handoff control in the CPU 13a and the CPU 42a;

BEST MODE OF CARRYING OUT THE INVENTION

An embodiment of the present invention will be described below with reference to the accompanying drawings.

Figure 1:
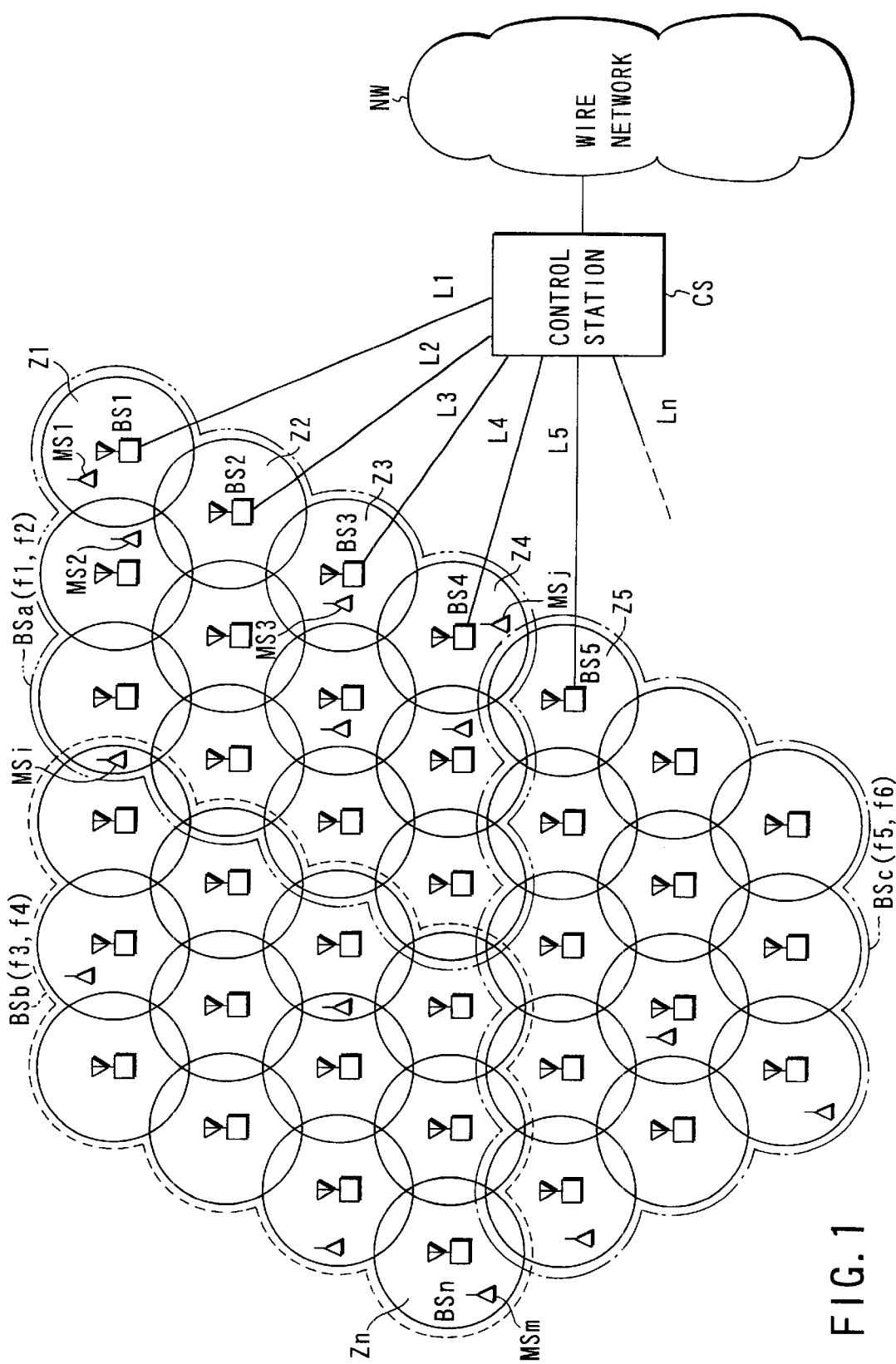
FIG. 1 is a view showing the schematic arrangement of a CDMA cellular radio system according to an embodiment of the present invention.
Figure 14:
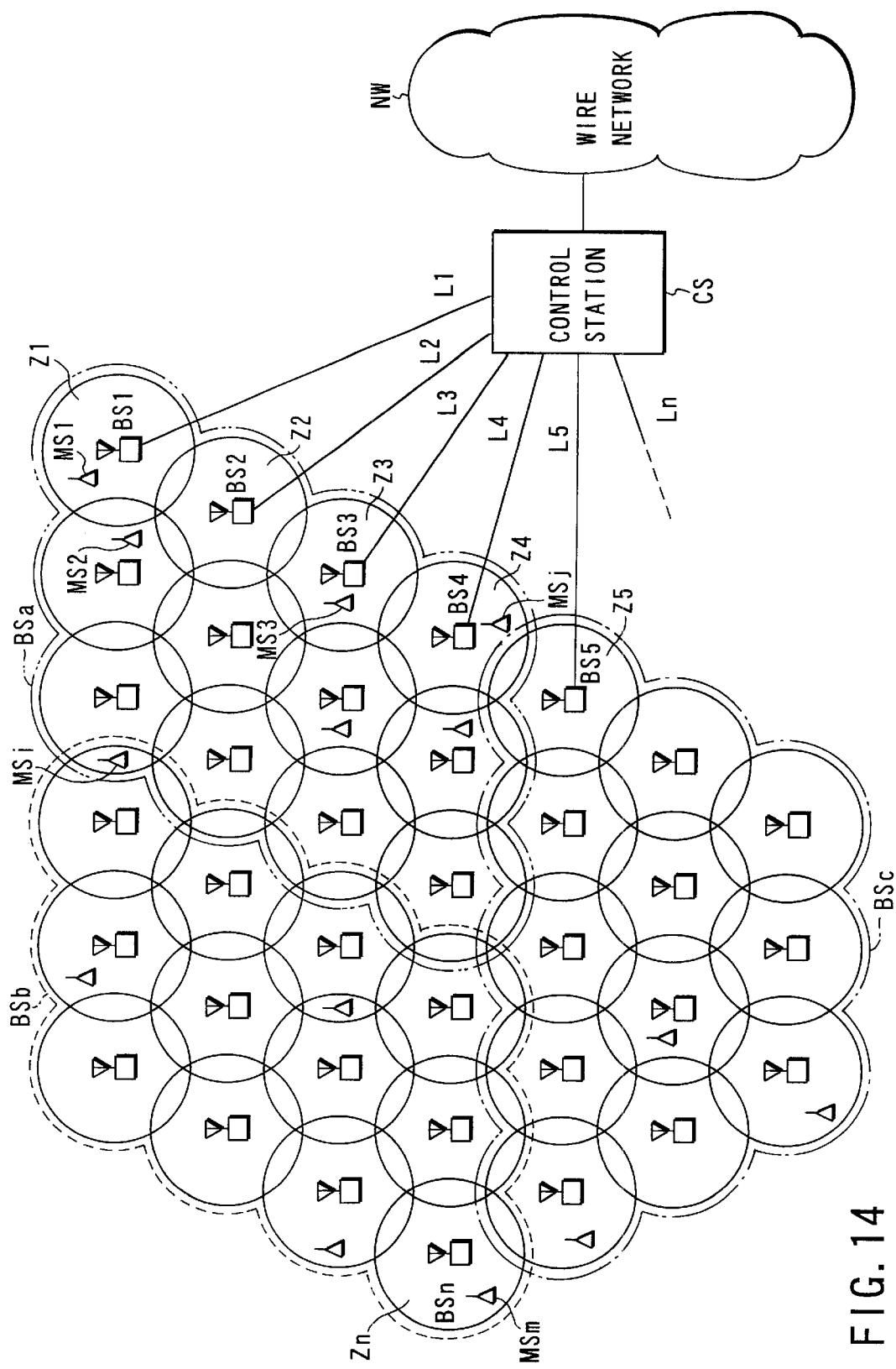
FIG. 14 is a view showing the schematic arrangement of a CDMA cellular radio system.

FIG. 1 shows the schematic arrangement of a CDMA cellular radio system according to this embodiment. The apparent arrangement of this system is the same as that shown in FIG. 14. However, this system differs from that shown in FIG. 14 in the allocation of radio frequencies to base station groups BSa to BSc and the handoff control function of the system as follows.

The system of this embodiment has a total of six radio frequencies f1 to f6. The radio frequencies f1 and f2 are allocated to the base station group BSa; the radio frequencies f3 and f4, to the base station group BSb; and the radio frequencies f5 and f6, to the base station group BSc. Note that the radio frequencies f1 to f6 are respectively composed of upstream carriers fU1 to fU6 for transmitting signals from mobile stations MS (MS1 to MSm) to base stations BS (BS1 to BSm) and downstream carriers fD1 to fD6 for transmitting signals from the base stations BS to the mobile stations MS. An upstream carrier fUk (k is 1 to 6) and a downstream carrier fDk satisfy:

$$fUk = FDk + [\text{predetermined frequency offset}]$$

Each base station BS transmits a pilot channel, a sync channel, a paging channel, and a downstream traffic channel with the above downstream carriers fD. The mobile station MS transmits an access channel and an upstream traffic channel with the above upstream carriers fU.

This system performs radio communication based on CDMA scheme between the base station BS and the mobile station MS by selectively using radio frequencies allocated to the base station BS. Various control operations associated with this radio communication include mobile handoff control to be performed when the mobile station MS moves between the cells of the base stations BS, and idle handoff control to be performed when the traffic of a specific radio frequency considerably increases as compared with the traffic of another radio frequency allocated to the same base station BS.

Figure 2:
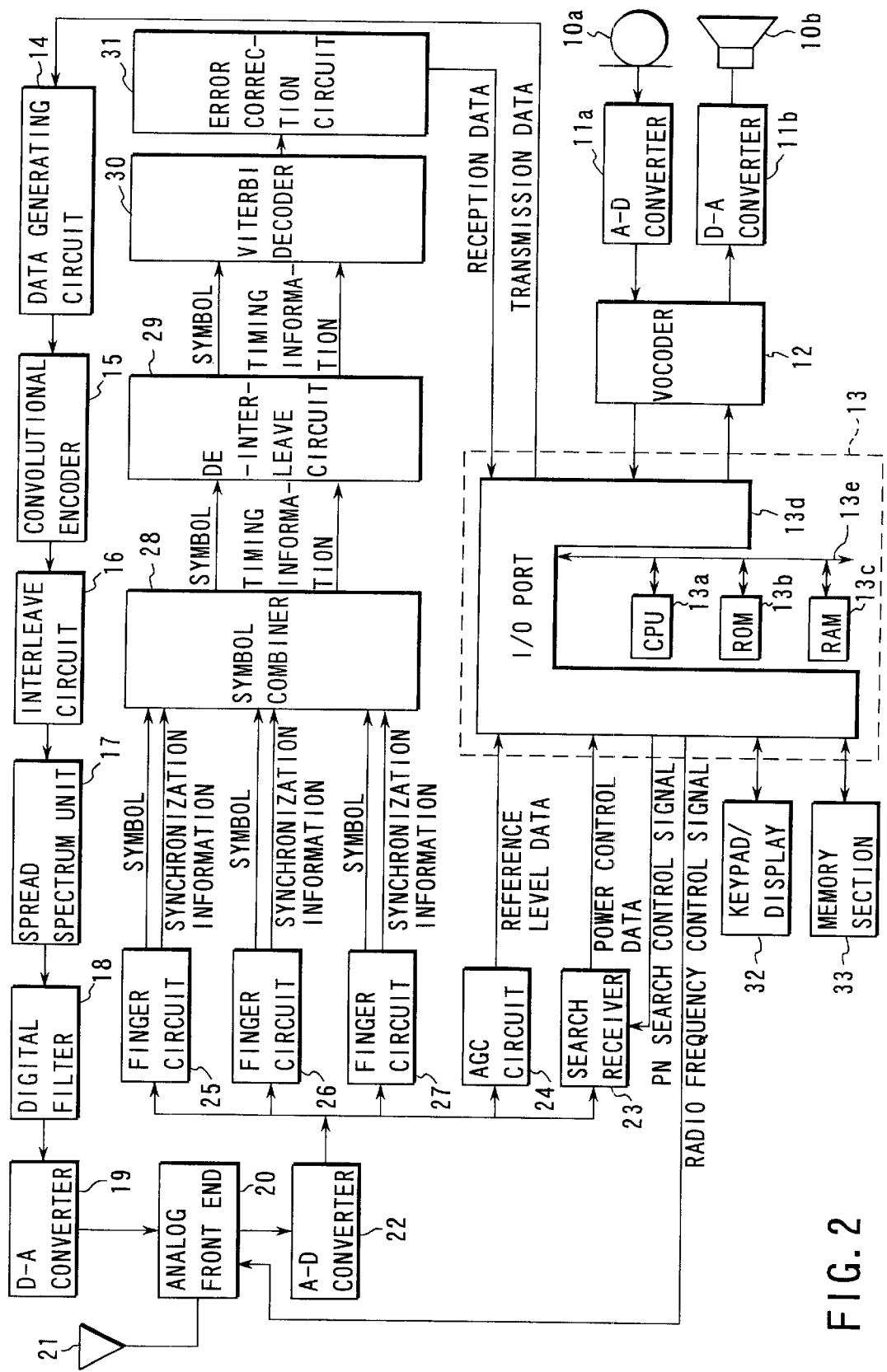
FIG. 2 is a block diagram showing the arrangement of a mobile station MS used in the system in FIG. 1.

FIG. 2 is a block diagram showing the arrangement of the mobile station MS used in the above CDMA cellular radio system.

As shown in FIG. 2, the mobile station MS includes a microphone 10a, a speaker 10b, an analog-digital converter (to be referred to as an A-D converter hereinafter) 11a, a digital-analog converter (to be referred to as a D-A converter hereinafter) 11b, a voice coder-decoder (to be referred to as a vocoder hereinafter) 12, a mobile station control section 13, a data generating circuit 14, a convolutional encoder 15, an interleave circuit 16, a spread spectrum unit 17, a digital filter 18, a digital-analog converter (to be referred to as a D-A converter hereinafter) 19, an analog front end 20, an antenna 21, an analog-digital converter (to be referred to as an A-D converter hereafter) 22, a search receiver (to be referred to as a search receiver hereafter) 23, an automatic gain control (AGE) circuit 24, finger circuits 25, 26, and 27, a symbol combiner 28, a de-interleave circuit 29, a Viterbi decoder 30, an error correction circuit 31, a keypad/display 32, and a memory section 33.

A speaker's transmission speech signal output from the microphone 10a is converted into a digital signal by the A-D converter 11a and is coded by the vocoder 12. The mobile station control section 13 adds a control signal and the like to the coded transmission signal output from the vocoder 12 to generate transmission data.

The data generating circuit 14 adds an error detection code and an error correction code to this transmission data. The transmission data output from the data generating circuit 14 is coded by the convolutional encoder 15. The interleave circuit 16 performs interleave processing for the transmission data output from the convolutional encoder 15. The transmission data output from the interleave circuit 16 is spectrum-spread into a broadband signal by the spectrum spreader 17 using PN and Walsh codes. The digital filter 18 removes unnecessary frequency components from this spectrum-spread transmission data. The transmission data output from the digital filter is converted into an analog transmission signal by the D-A converter 19. This analog transmission signal is up-converted into a signal having a predetermined radio channel frequency and power-amplified to a predetermined transmission power level by the analog front end 20. Thereafter, the signal is transmitted from the antenna 21 to the base station BS.

On the other hand, a radio signal received by the antenna 21 is low-noise-amplified and down-converted into a signal having an intermediate frequency or baseband frequency by the analog front end 20. The received signal output from the analog front end 20 is converted into a digital signal at a predetermined sampling period by the A/D converter 22.

The received transmission data output from the A-D converter 22 is then input to the search receiver 23, the automatic gain control circuit 24, and the three finger circuits 25, 26, and 27.

Each of the finger circuits 25, 26, and 27 includes an initial capturing section, a clock tracking section, and a data demodulation section. The data demodulation section de-spreads the spectrum of the received transmission signal from the base station BS, and integrates the resultant data through the integrating dump filter for a one-symbol period. Note that the three finger circuits are used to receive a multipath reception signal at a high S/N ratio by using the path diversity effect, and to switch base stations BS, to which the mobile station is connected, during communication without disconnecting the radio path, i.e., to perform a so-called soft handoff.

The respective symbols demodulated by the finger circuits 25, 26, and 27 are input to the symbol combiner 28, together with synchronization information, to be synthesized. The synthesized demodulated symbol is input to the de-interleave circuit 29, together with timing information, to be subjected to de-interleave processing in the de-interleave circuit 29. The demodulated symbol after this de-interleave processing is Viterbi-decoded by the Viterbi decoder 30. The demodulated symbol after this Viterbi-decoding is subjected to error correction decoding processing in the error correction circuit 31 to become received data. The received data is input to the mobile station control section 13. The mobile station control section 13 separates the input received data into speech data and control data. The speech data is speech-decoded by the vocoder 12 and converted into an analog signal by the D/A converter 11b. The analog signal is then output as speech from the speaker 10b.

The keypad/display 32 is used by the user to input dial data, control data, and the like, and serves to display various information associated with the operation state of the mobile station MS. The operation of the keypad/display 32 is controlled by the mobile station control section 13.

The memory section 33 is used to store various data required when the mobile station control section 13 performs various operations, and has a nonvolatile storage medium such as an EEPROM. This memory section 33 stores a radio frequency list (to be described later) in a storage area formed from the nonvolatile storage medium.

The search receiver 23 basically has the same arrangement as that of each of the finger circuits 25, 26, and 27. The search receiver 23 searches the PN codes of pilot signals broadcasted from the base stations BS in units of radio frequencies to capture the offsets of the PN codes. The power control data obtained by this PN code searching operation is loaded into the mobile station control section 13.

The mobile station control section 13 has a CPU 13a, a ROM 13b, a RAM 13c, and an I/O port 13d connected to each other through a system bus 13e.

The CPU 13a operates on the basis of the programs stored in the ROM 13b, and collectively controls the respective sections of this mobile station MS, thereby implementing the operation of the mobile station MS.

The ROM 13b stores the operation programs and the like for the CPU 13a.

The RAM 13c temporarily stores data required for the CPU 13a to perform various operations.

The functions implemented by the CPU 13a by means of software processing include a candidate frequency setting function, a radio frequency list forming function, a candidate frequency initializing function, and a mobile-station-side handoff processing function, as well as the known general control function of the mobile station MS.

The candidate frequency setting function serves to set a radio frequency to be used when communication is started next, i.e., a candidate frequency to be used as a radio frequency in the standby state. This candidate frequency setting function includes the function of changing candidate frequencies in accordance with an idle handoff instruction from the base station BS, i.e., the function of performing idle handoff.

The radio frequency list forming function serves to receive frequency use state information from the nearest base station BS, which indicates the use state of radio frequencies in the cell formed by the base station BS and the use state of radio frequencies in a predetermined neighboring cell, and form a radio frequency list indicating the priority levels of the respective radio frequencies on the basis of the frequency use state information. The radio frequency list forming function serves to store this formed radio frequency list in the memory section 33.

The candidate frequency initializing function serves to initialize candidate frequencies by referring to the radio frequency list stored in the memory section 33 when the power to the mobile station MS is turned on.

When the mobile station MS moves from the cell of a given base station BS to the cell of another neighboring base station BS, the mobile-station-side handoff control function serves to perform control, together with these base stations BS, to switch a first radio path connecting the mobile station MS to the source base station BS to a second radio path connecting the mobile station MS to the destination base station BS. At this time, the mobile-station-side handoff control function performs soft handoff control when the radio frequency of the first radio path is equal to that of the second radio path. Assume that in hard handoff control, allocated radio frequency notification information for notifying the radio frequency to be used to connect the second radio path is supplied from the source base station BS. In this case, the mobile-station-side handoff control function serves to connect the second radio path by using this radio frequency.

Figure 3:
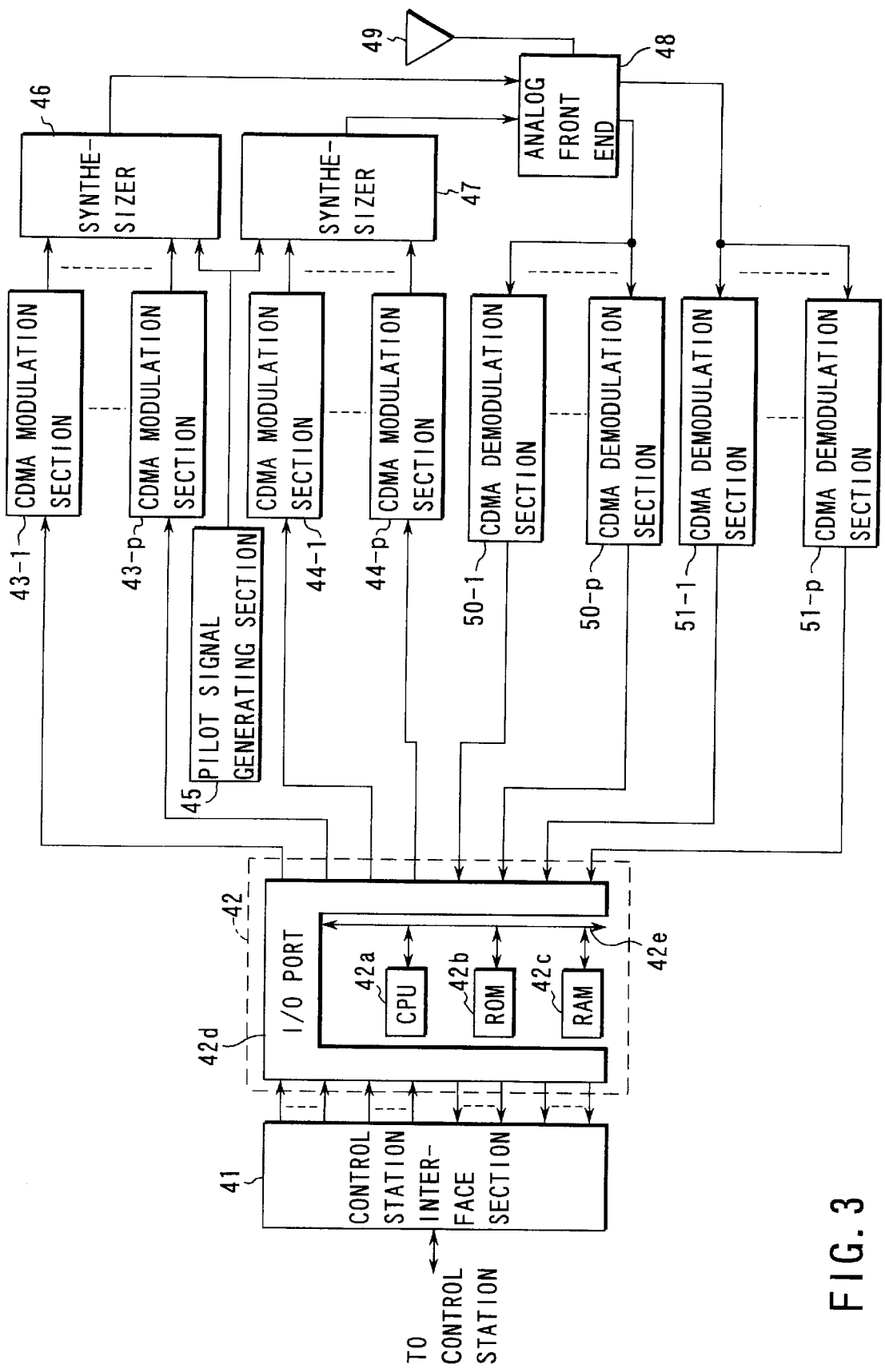
FIG. 3 is a block diagram showing the arrangement of a base station BS used in the system in FIG. 1.

FIG. 3 is a block diagram showing the arrangement of the base station BS.

As shown in FIG. 3, the base station BS includes a control station interface section 41, a base station control section 42, p (p is the number of traffic channels for one radio frequency) CDMA modulation sections 43 (43-1 to 43-p) for the first radio frequency, p CDMA modulation sections 44 (44-1 to 44-p) for the second radio frequency, a pilot signal generating section 45, synthesizers 46 and 47, an analog front end 48, an antenna 49, p CDMA demodulation sections 50 (50-1 to 50-p) for the first radio frequency, and p CDMA demodulation sections 51 (51-1 to 51-p) for the second radio frequency.

The control station interface section 41 transmits/receives speech data and control data to/from the control station CS. For example, speech data sent in a time-divisionally multiplexed state from the control station CS is demultiplexed by the control station interface section 41. Each of the demultiplexed speech data is converted into data in a data form for transmission on a radio path by the control station interface section 41.

The speech data having undergone data conversion are parallelly supplied to the base station control section 42. The base station control section 42 adds control signals and the like to the respective speech data to generate transmission data.

These transmission data are input to CDMA modulation sections 34 and 44 for the corresponding traffic channels. Each of CDMA modulation sections 34 and 44 has circuits similar to the data generating circuit 14, the convolutional encoder 15, the interleave circuit 16, the spread spectrum unit 17, the digital filter 18, and the D-A converter 19 in the mobile station MS. The transmission data are therefore subjected to addition of error detection codes and error correction codes, convolutional coding, interleave processing, spread spectrum processing, and conversion to analog signals in CDMA modulation sections 43 and 44. As a result, analog transmission signals are obtained. Note that CDMA modulation sections 43-1 to 43-p use different Walsh codes corresponding to the respective traffic channels in spreading the signal spectrum. In addition, CDMA modulation sections 44-1 to 44-p use different Walsh codes corresponding to the respective traffic channels in spreading the signal spectrum.

The analog transmission signals obtained by the respective CDMA modulation sections 43 are synthesized with each other by the synthesizer 46. At this time, the synthesizer 46 also synthesizes a pilot channel signal generated by the pilot signal generating section 45 with the above signals. The analog transmission signals obtained by the respective CDMA modulation sections 44 are synthesized with each other by the synthesizer 47. At this time, the synthesizer 47 also synthesizes a pilot channel signal generated by the pilot signal generating section 45 with the above signals. Each pilot channel signal contains a PN code (common to CDMA modulation sections 43 and 44) used by CDMA modulation sections 43 and 44 for spread spectrum processing.

Both the output signals from the synthesizers 46 and 47 are input to the analog front end 48. The output signal from the synthesizer 46 is up-converted into the first radio frequency and power-amplified to a predetermined transmission power level by the analog front end 48. The output signal from the synthesizer 47 is up-converted into the second radio frequency and power-amplified to a predetermined transmission power level by the analog front end 48. The output signals from the analog front end 48 are transmitted from the antenna 49 to the mobile station MS by radio. Note that the first radio frequency is one of the two radio frequencies allocated to the base station, and the second radio frequency is the other of the two radio frequencies allocated to the base station. That is, for example, in the base station BS belonging to the base station group BSa, the first radio frequency is f1, and the second radio frequency is f2.

An RF signal obtained when a radio signal is received through the antenna 49 is supplied to the analog front end 48. This RF signal is low-noise-amplified by the analog front end 48. Signals in the bands of the two radio frequencies allocated to the base station BS are extracted from this high-frequency signal. These extracted signals are down-converted into intermediate frequencies or baseband frequencies by the analog front end 48. The resultant signals are reception signals.

Of these reception signals, the signal extracted from the first radio frequency band is branched/input to CDMA demodulation sections 50-1 to 50-p. Of the reception signals, the signal extracted from the second radio frequency band is branched/input to CDMA demodulation sections 51-1 to 51-p.

Each of CDMA demodulation sections 50 and 51 includes circuits similar to the A-D converter 22, the search receiver 23, the automatic gain control circuit 24, the finger circuits 25, 26, and 27, the symbol combiner 28, the de-interleave circuit 29, the Viterbi decoder 30, and the error correction circuit 31 in the mobile station MS. Reception signals are therefore subjected to conversion to digital signals, spread spectrum processing, integration for a one-symbol period, symbol synthesis, de-interleave processing, Viterbi decoding, and error correction decoding processing in CDMA demodulation sections 50 and 51. As a result, reception data are obtained and parallelly input to the base station control section 42. In this case, CDMA demodulation sections 50-1 to 50-p use different Walsh codes corresponding to the respective traffic channels in spreading the signal spectrum. CDMA demodulation sections 51-1 to 51-p use different Walsh codes corresponding to the respective traffic channels in de-spreading the signal spectrum. As a result, in CDMA demodulation sections 50 and 51, reception data received through the corresponding to traffic channels are extracted.

The base station control section 42 separates the respective reception data into speech data and control data. Of these data, the speech data are converted into data in a data form for transmission through a transmission path between itself and the control station by the control station interface section 41. The respective speech data having undergone data conversion are transmitted in, for example, a time-divisional multiplexed state to the control station CS.

The base station control section 42 has a CPU 42a, a ROM 42b, a RAM 42c, and an I/O port 42d connected to each other through a system bus 42e.

The CPU 42a operates on the basis of the programs stored in the ROM 42b, and collectively controls the respective sections of this base station BS, thereby implementing the operation of the base station BS.

The ROM 42b stores operation programs and the like for the CPU 42a.

The RAM 42c temporarily stores data required for the CPU 42a to perform various operations.

Note that the functions implemented by the CPU 42a by means of software processing include a channel occupancy monitoring function, an idle handoff controlling function, a frequency use state notifying function, a handoff method determining function, and a network-side handoff control function, as well as a known general control function in the base station BS.

In this case, the channel occupancy monitoring function serves to monitor the channel occupancies of radio frequencies allocated to the base station BS.

When the difference between the channel occupancies of the respective radio frequencies allocated to the base station BS becomes a predetermined state, the idle handoff controlling function serves to output an idle handoff instruction to the mobile station MS in the standby state in the cell formed by the base station BS to set the radio frequency with the lower channel occupancy as a candidate frequency.

The frequency use station notifying function serves to generate frequency use state information indicating the use state of the radio frequencies in the cell of the base station BS and the use state of the radio frequencies in a predetermined neighboring cell, and perform processing for transmission of the information to the mobile station MS.

The handoff method determining function serves to determine whether to perform soft handoff or hard handoff for the mobile station MS, when the mobile station moves from the cell of the base station BS to the cell of another base station BS belonging to the same base station group.

The network-side handoff control function serves to perform handoff control to perform handoff for the mobile station MS by the method determined by the handoff method determining function when the mobile station MS moves from the cell of the base station BS to the cell of another base station BS belonging to the same base station group. The network-side handoff control function includes the function of notifying the mobile station MS of the radio frequency with a channel occupancy lower than that of the radio frequency that has been used by the mobile station MS in the cell it is entering, when the method determined by the handoff method determining function is hard handoff.

The operation of the system having the above arrangement will be described next.

Idle handoff control will be described first.

Figure 4:
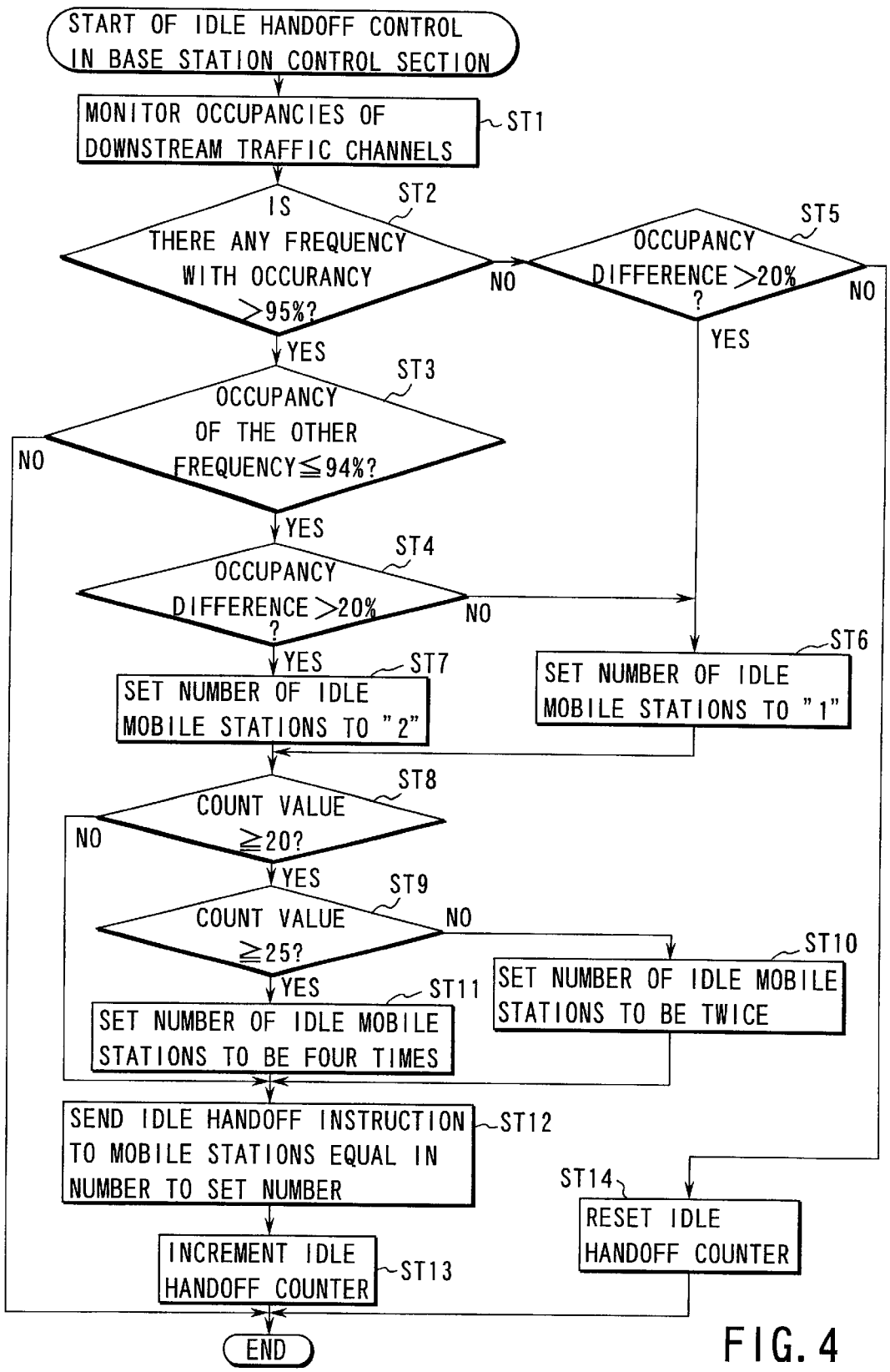

FIG. 4 is a flow chart showing a control procedure for idle handoff control in the CPU 42a.

The CPU 42a in each base station BS performs idle handoff control at a predetermined timing, e.g., at predetermined periods. In this idle handoff control, first of all, the CPU 42a monitors the occupancies (channel occupancies) of the downstream traffic channels of the respective radio frequencies allocated to the self-station during operation (step ST1). The base station control section 42 checks, on the basis of the monitoring result on the channel occupancies, whether the current state corresponds to any one of the following three conditions (steps ST2 to ST5).

Figure 5:
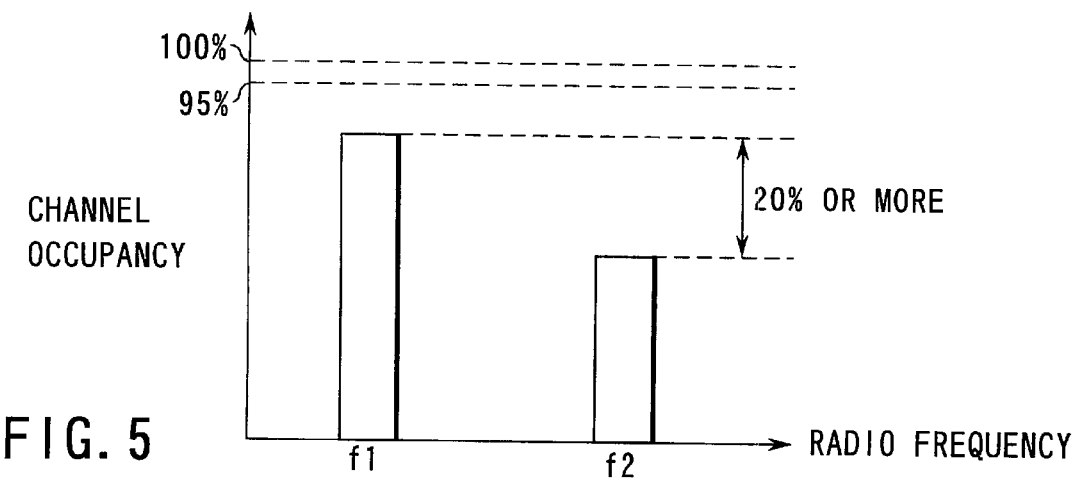
FIG. 5 is a view showing a first determination condition for determining the necessity of idle handoff.
Figure 6:
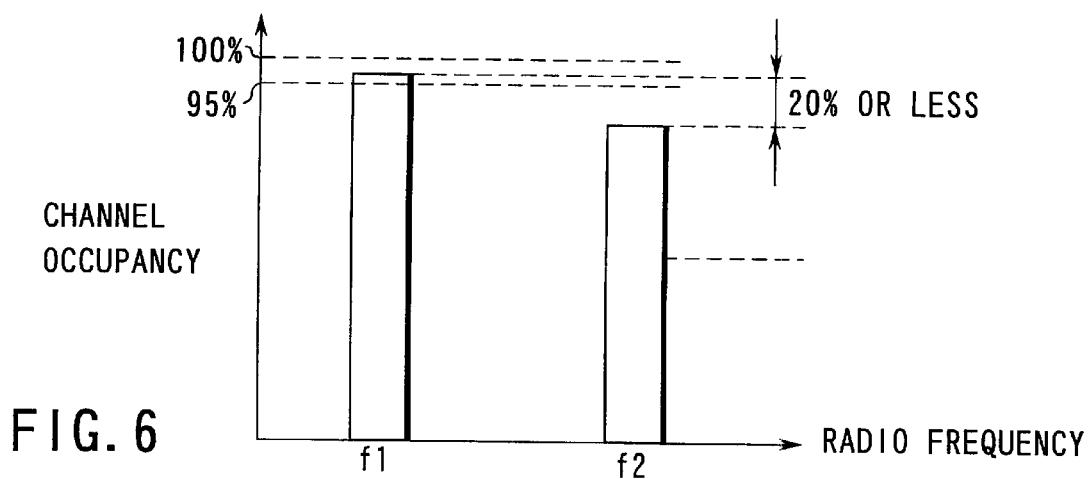
FIG. 6 is a view showing a second determination condition for determining the necessity of idle handoff.
Figure 7:
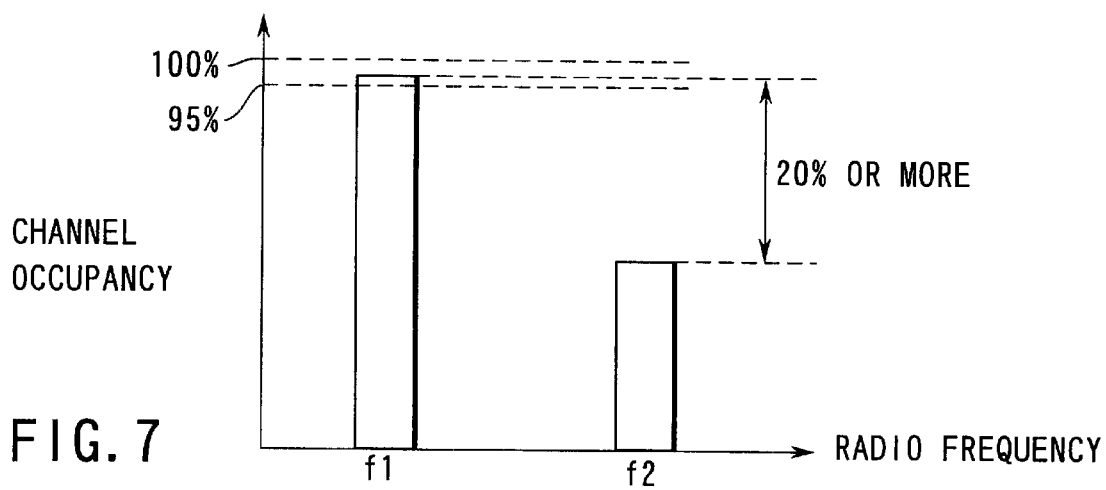
FIG. 7 is a view showing a third determination condition for determining the necessity of idle handoff.

(1) For example, as shown in FIG. 5,
the difference between the channel use ratios of the two radio frequencies exceeds 20%, and
neither of the channel occupancies of the two radio frequencies exceeds 95%.
(2) For example, as shown in FIG. 6,
one of the channel occupancies of the two radio frequencies exceeds 95%,
the other of the channel occupancies of the two radio frequencies is equal to or lower than 94%, and
the difference between the channel use ratios of the two radio frequencies does not exceed 20%.
(3) For example, as shown in FIG. 7,
one of the channel occupancies of the two radio frequencies exceeds 95%,
the other of the channel occupancies of the two radio frequencies is equal to or lower than 94%, and
the difference between the channel use ratios of the two radio frequencies exceeds 20%.

These three conditions are conditions for determining whether idle handoff is necessary. When the current state corresponds to any one of them, it indicates that idle handoff is necessary.

If the CPU 42a determines that idle handoff is necessary, and the determination is based on condition (1) or (2), the number of idle mobile stations is set to "1" (step ST6). If the determination is based on condition (3), the number of idle mobile stations is set to "2" (step ST7).

Subsequently, the CPU 42a checks whether the count value of an idle handoff counter for counting the number of times idle handoff is performed corresponds to any one of the following three conditions (steps ST8 and ST9):
(1) smaller than "20",
(2) equal to or larger than "2" and smaller than "25", and
(3) equal to or larger than "25".

If the count value of the idle handoff counter corresponds to condition (2), the CPU 42a changes the number of idle mobile stations to a number twice the number set in step ST6 or ST7 (step ST10). If the counter value of the idle handoff counter corresponds to condition (3), the CPU 42a changes the number of idle mobile stations to a number four times the number set in step ST6 or ST7 (step ST11). If the count value of the idle handoff counter corresponds to condition (2), the CPU 42a keeps the number of idle mobile stations equal to the number set in step ST6 or ST7.

Subsequently, the CPU 42a randomly selects the mobile stations MS equal in number to the number set at this time point from the mobile stations MS that are located in the cell of the self-base station BS and in the standby state. The CPU 42a sends an idle handoff instruction controlling a radio frequency with a lower channel occupancy to each of the selected mobile stations MS (step ST12). When this idle handoff instruction sending operation is complete, the CPU 42a increments the count value of the idle handoff counter by one (step ST13). Thereafter, idle handoff control is terminated.

If the CPU 42a determines in steps ST2 to ST6 that none of conditions (1) to (3) is satisfied, the CPU 42a terminates this idle handoff control without sending any idle handoff instruction. If, however, there is no radio frequency whose channel occupancy exceeds 95%, and the difference between the two radio frequencies does not exceed 20%, the CPU 42a terminates the processing after resetting the idle handoff counter (step ST14).

Figure 8:
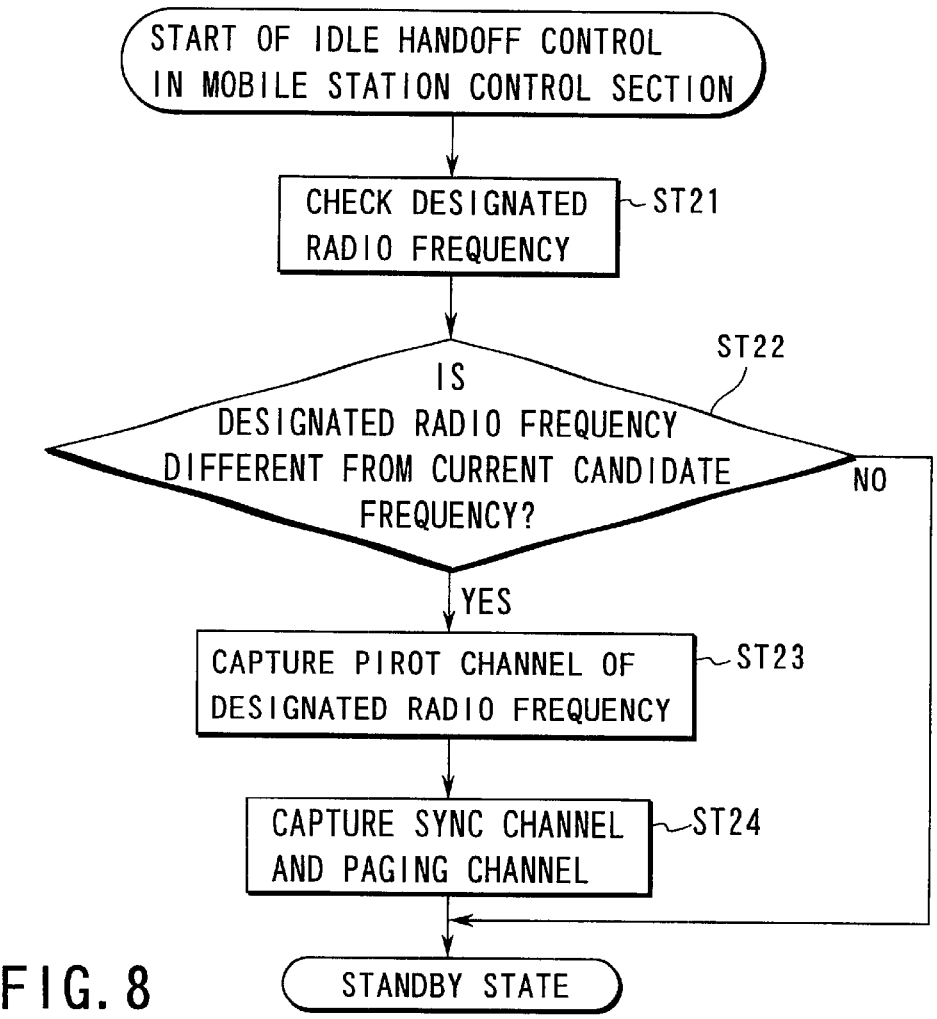

Upon reception of the idle handoff instruction transmitted from the base station BS in the above manner, the CPU 13a of the mobile station MS starts idle handoff control as shown in FIG. 8.

Upon reception of the idle handoff instruction, the CPU 13a recognizes the contents of the idle handoff instruction first, and then determines the designated radio frequency (step ST21). The CPU 13a checks whether the designated radio frequency differs from the current candidate frequency (step ST22).

If the designated radio frequency differs from the current candidate frequency, the CPU 13a captures the pilot channel of the designated radio frequency (step ST23). This pilot channel capturing operation is performed by acquiring the phase and PN timing through the search receiver 23. Upon completion of the pilot channel capturing operation, the CPU 13a receives a sync channel to acquire information indicating the system configuration and the system timing, and also captures a paging channel (step ST24).

Upon completion of the above processing, the CPU 13a returns to the standby state. If the designated radio frequency is equal to the current candidate frequency, the CPU 13a maintains the same standby state as that has been set until now without performing the processing in steps ST23 and ST24. With this operation, the mobile station MS is set in the standby state in which the radio frequency designated by the idle handoff instruction is set as a candidate frequency.

This operation raises the possibility that a radio frequency with a lower channel occupancy will be used for communication from now on, although the channel occupancies of the respective radio frequencies do not change instantly. Eventually, therefore, the channel occupancies of the respective radio frequencies are averaged. When the channel occupancies of the respective radio frequencies are averaged, available traffic channels can be ensured in the respective radio frequencies in many cases, thereby reliably handling new calls and mobile handoffs.

Control at power-off and start-up control at power-on in the mobile station MS will be described next.

Figure 9:
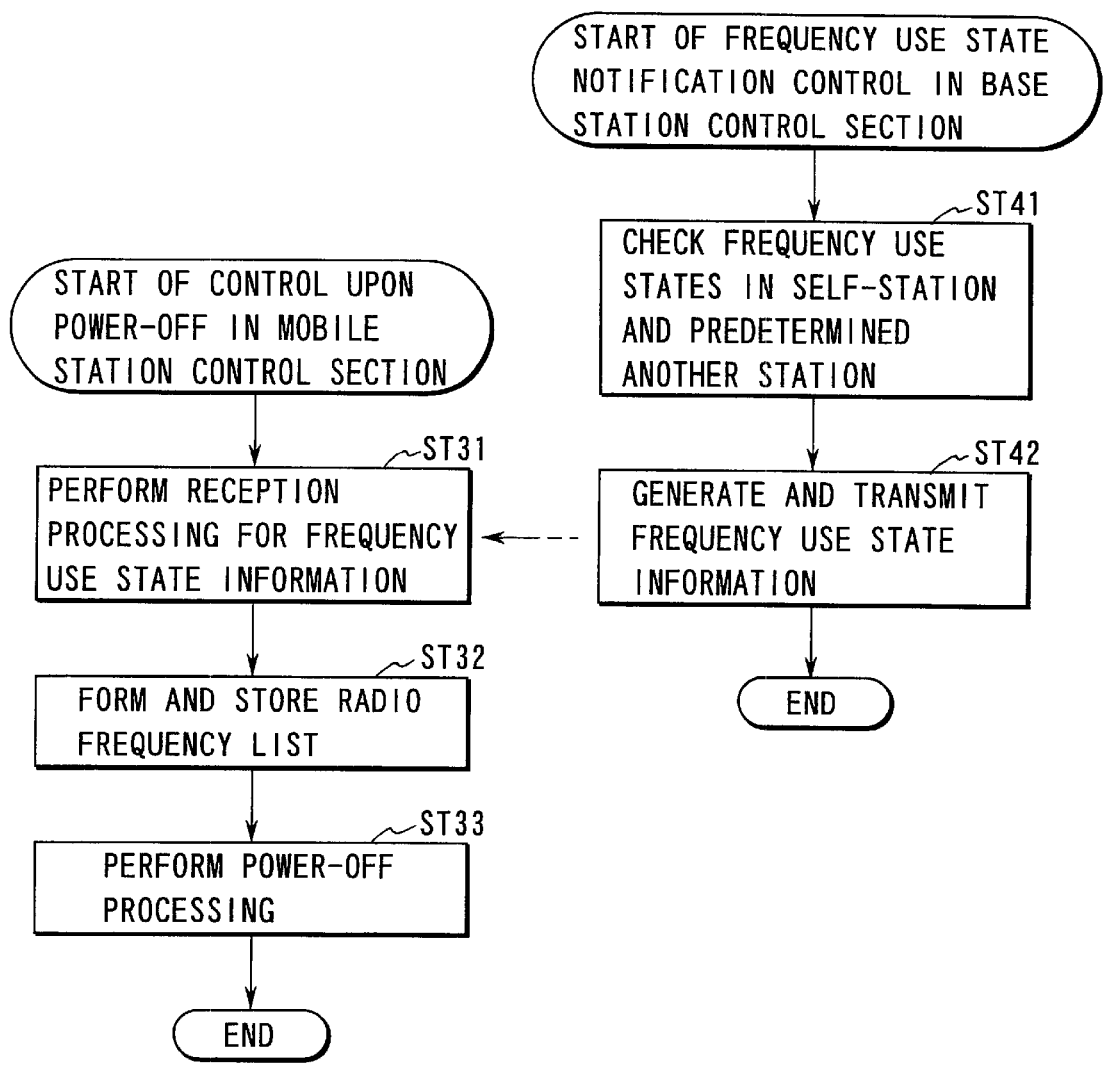

When the user designates power-off in the mobile station MS, the CPU 13a of the mobile station MS starts control at power-off as shown in FIG. 9.

Upon reception of a power-off instruction, the CPU 13a performs reception processing for frequency use state information first (step ST31).

Note that the CPU 42a of each base station BS performs use state notification control as shown in FIG. 9 at a predetermined timing, e.g., at predetermined periods or the time required by the mobile station. In this use state notification control, first of all, the CPU 42a checks the use states of radio frequencies in the self-station and a predetermined neighboring base station (step ST41). The CPU 42a then generates frequency use state information for notifying the use state of radio frequencies in each base station, and transmits the information to the mobile station MS (step ST42).

In the mobile station MS, the CPU 13a outputs a request to the base station BS or waits for frequency use state information to receive the frequency use state information transmitted from the base station BS in the above manner in step ST31. Upon completion of the reception of the frequency use state information, the CPU 13a generates a radio frequency list in consideration of the use states of radio frequencies in the respective base stations, indicated by the frequency use state information, and stores the list in the memory section 33 (step ST32).

In this radio frequency list, priority levels are assigned to the respective radio frequencies indicated by the frequency use state information in accordance with a predetermined rule. For example, the highest priority level ("1") is assigned to a radio frequency set as a candidate frequency, and lower priories are respectively assigned to another frequency in the cell where the mobile station is currently located and the radio frequencies in neighboring cells (in the order of occupancies).

Upon completion of the generation and storage of a radio frequency list, the CPU 13a performs known processing to turn off the power (step ST33), and terminates control at power-off.

Figure 10:
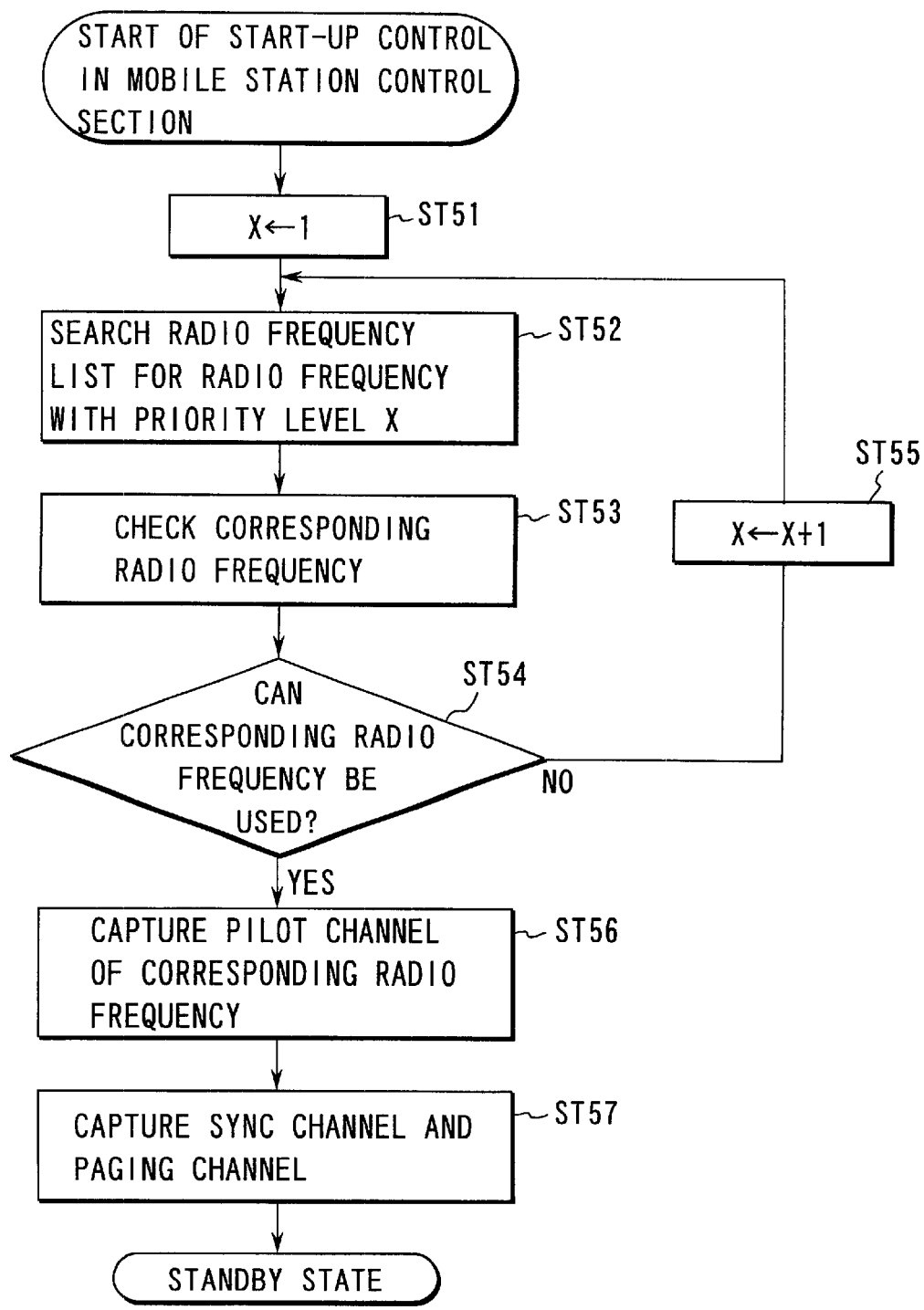

When the user designates power-on in the mobile station MS, the CPU 13a of the mobile station MS performs start-up control as shown in FIG. 10.

Upon reception of the power-on instruction, the CPU 13a initializes a variable X to "1" (step ST42).

The CPU 13a then searches the radio frequency list stored in the memory section 33 for a radio frequency whose priority level is "X" (step ST52). The CPU 13a checks the searched-out radio frequency (step ST53), and determines whether the radio frequency can be used (step ST54). If the radio frequency cannot be used, the CPU 13a updates the variable X to "X+1" (step ST55), and repeats the processing in steps ST52 to ST54.

If a radio frequency that can be used is found, the CPU 13a captures the pilot channel of the radio frequency (step ST56). This pilot channel capturing operation is performed by acquiring the phase and PN timing through the search receiver 23. Upon completion of pilot channel capturing, the CPU 13a receives a sync channel to receive information indicating the system configuration and the system timing, and also captures a paging channel (step ST57).

Upon completion of the above processing, the CPU 13a enters the standby state.

With this operation, at the time of start-up operation by power-on, the CPU 13a enters the standby state while a radio frequency with a higher priority level, which is set at the time of power-off in accordance with the use state of each radio frequency, is set as a candidate frequency. If, therefore, the use state of each radio frequency at the time of power-on has not greatly changed from that at the time of power-off, the CPU 13a is set in the standby state with a radio frequency with a low occupancy. This raises the possibility that a radio frequency with a lower channel occupancy will be used for communication from now on. Eventually, therefore, the channel occupancies of the respective radio frequencies are averaged.

Even if the use state of each radio frequency at the time of power-on has changed from that at the time of power-off, since many mobile stations MS power off at various timings, radio frequencies are randomly selected by the respective mobile stations MS after power-off. As a result, the channel occupancies of the respective radio frequencies will be averaged.

When the channel occupancies of the respective radio frequencies are averaged in this manner, available traffic channels can be ensured in the respective radio frequencies in many cases, thereby reliably handling new calls and mobile handoffs.

Mobile handoff control will be described next. A mobile station MSj located in a cell Z4 of the base station BS4 will be exemplified.

Figure 11:
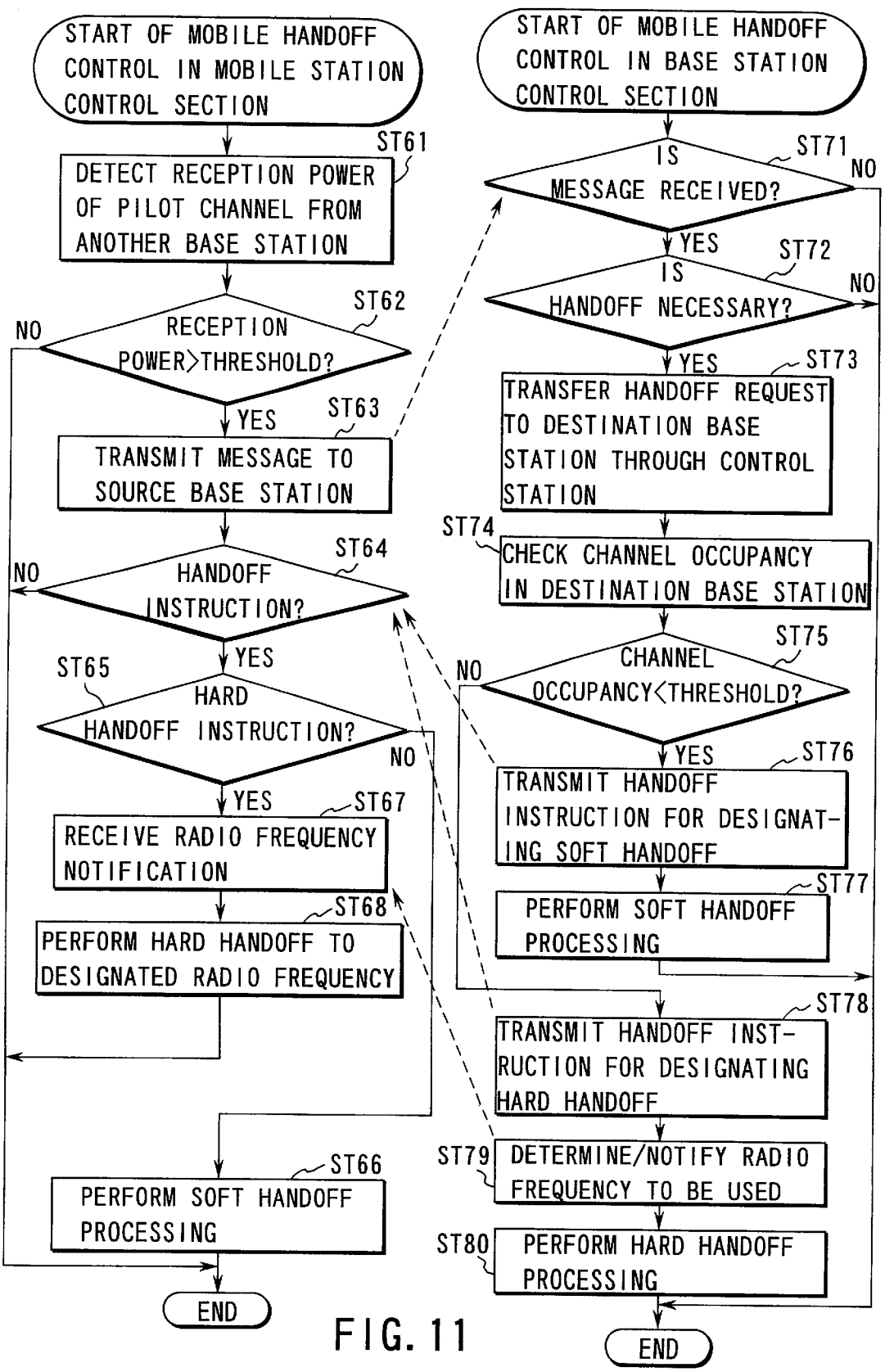

The CPU 13a in the mobile station MSj performs mobile handoff control as shown in FIG. 11 at a predetermined timing, e.g., at predetermined periods, during radio communication.

At the predetermined timing, the CPU 13a detects the reception power level of the pilot channel that corresponds to the currently used radio frequency and is transmitted from the base station BS other than the base station BS4 forming the cell Z4 in which the mobile station is present (step ST61). The CPU 13a compares the detected value with a predetermined threshold (step ST62). If the reception power level of the pilot channel from the base station BS other than the base station BS4 is equal to or lower than the threshold, the mobile station MSj is not located at the boundary between the cell Z4 and another cell. In this case, since no mobile handoff is required, the CPU 13a terminates this mobile handoff control.

Figure 12:
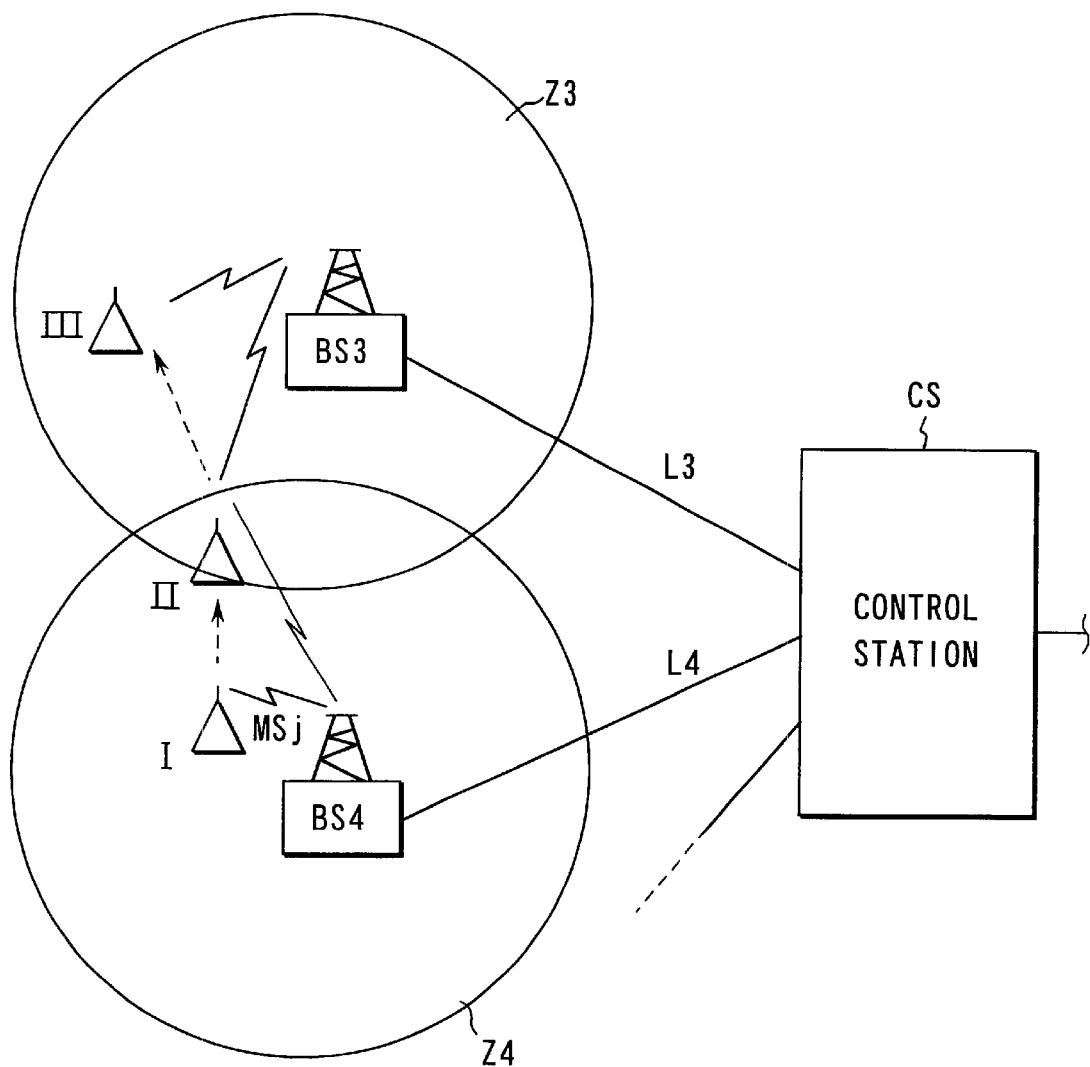
FIG. 12 is a view for explaining mobile handoff control.

Assume that the mobile station MSj moves from a position I in the cell Z4 of the base station BS4 to a boundary position II between the cell Z4 of the base station BS4 and a cell Z3 of the base station BS4, as shown in FIG. 12. In this case, the reception level of the pilot channel from the base station BS3 increases in the mobile station MSj. When the reception power of the pilot channel from the base station BS other than the base station BS4 exceeds the threshold, the CPU 13a transmits a message indicating the phase of a PN code sent over the pilot channel and the reception power level of the pilot channel to the base station BS4 (to be referred to as a source base station hereinafter) forming the cell Z4 in which the mobile station has been located (step ST63). Thereafter, the CPU 13a checks whether a handoff instruction is sent from the source base station BS4 within a predetermined period of time (step ST64).

In the base station BS4, the CPU 42a performs mobile handoff control as shown in FIG. 11 at a predetermined timing, e.g., predetermined periods.

At the predetermined timing, the CPU 42a checks whether the message transmitted from the base station MS is received (step ST71). If the message transmitted from the mobile station MSj is received as described above, the CPU 42a analyzes the message to check whether handoff is required (step ST72).

If it is determined that handoff is not required, or it is determined in step ST71 that no message is received, the CPU 42a terminates mobile handoff control. If, however, a message is received from the mobile station MSj that has moved to a boundary position II between the cell Z4 of the base station BS4 and the cell Z3 of the base station BS3 as shown in FIG. 12, handoff is required. In such as case, therefore, the CPU 42a determines the cell Z3 as a cell the mobile station MSj is entering from the message, and transfers a handoff request to the base station (to be referred to as a destination base station) forming the cell Z3 through the control station CS (step ST73). The CPU 42a of the destination base station BS4 checks the channel occupancy measured by the channel occupancy monitoring means 42a in the new control station BS3 (step ST74). The CPU 42a of the source base station BS4 then checks whether the channel occupancy of the radio frequency currently used by the mobile station MSj in the destination base station BS3 exceeds a predetermined threshold (step ST75).

If the channel occupancy of the radio frequency currently used by the mobile station MSj in the destination base station BS3 is equal to or lower than the predetermined threshold, the radio frequency currently used by the mobile station MSj can also be used at the new. The CPU 42a of the source base station BS4 therefore determines soft handoff as a handoff method to be used, and transmits a handoff instruction for controlling soft handoff to the mobile station MSj (step ST76). Thereafter, the CPU 42a of the source base station BS4 performs soft handoff by a known procedure in cooperation with the mobile station MSj and the destination base station BS3 (step ST77).

If the channel occupancy of the radio frequency currently used by the mobile station MSj in the destination base station BS3 exceeds the predetermined threshold, continuous use of the radio frequency currently used by the mobile station MSj in the cell it is entering is not preferable. The CPU 42a of the source base station BS4 determines hard handoff as a handoff method to be used, and transmits a handoff instruction for controlling hard handoff to the mobile station MSj (step ST78). The CPU 42a of the source base station BS4 determines a radio frequency whose channel occupancy in the destination base station BS3 does not exceed the predetermined threshold and is lowest as a radio frequency to be used, and notifies the mobile station MSj of this radio frequency (step ST79). The CPU 42a of the source base station BS4 performs hard handoff by a known procedure in cooperation with the mobile station MSj and the destination base station BS3 (step ST80).

If a handoff instruction transmitted from the source base station BS4 in the above manner is received, the CPU 13a of the mobile station MSj determines in step ST64 that handoff is instructed. In this case, the CPU 13a checks whether this handoff instruction designates hard handoff (step ST65).

If the handoff instruction does not designate hard handoff, the CPU 13a performs soft handoff by a known procedure in cooperation with the source base station BS4 and the destination base station BS3 (step ST66).

If the handoff instruction designates hard handoff, the CPU 13a receives a radio frequency notification following the handoff instruction (step ST67). The CPU 13a then performs hard handoff to a state in which the radio frequency designated by the radio frequency notification is used, by a known procedure, in cooperation with the source base station BS4 and the destination base station BS3 (step ST68).

With this operation, when soft handoff cannot be performed because there is no available traffic channel in the new cell with respect to the radio frequency currently used by the mobile station MSj, another radio frequency that can be used is selected, and hard handoff is performed. In this case, although a slight deterioration in speech communication quality cannot be avoided, at lest the worst case, e.g., a handoff failure, can be prevented. In addition, when one of the two radio frequencies allocated to a given base station BS exhibits dense traffic, the radio frequency used by the mobile station that moves while using the radio frequency with dense traffic is switched to another radio frequency. Therefore, the channel occupancies of the two radio frequencies can be averaged.

As described above, according to this embodiment, measures are taken to make the use of radio frequencies random with respect to a radio frequency as a candidate to be used by each mobile station MS in the standby state, a radio frequency as a candidate to be used by each mobile station MS at power-on, and a radio frequency to be used in a new cell when each mobile station MS under radio communication moves between cells within the same base station group. With this, the channel occupancies of the respective radio frequencies in each base station BS can be averaged. By averaging the channel occupancies of the respective radio frequencies in each base station BS, traffic channels can be efficiently used.

Figure 13A:
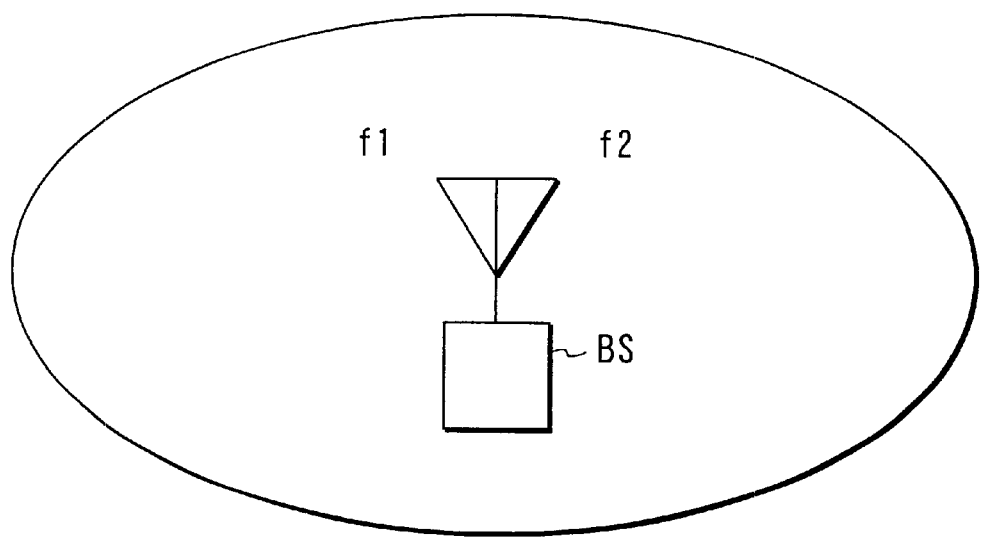
FIGS. 13A and 13B are views each showing a modification of the arrangement of the base station BS.
Figure 13B:
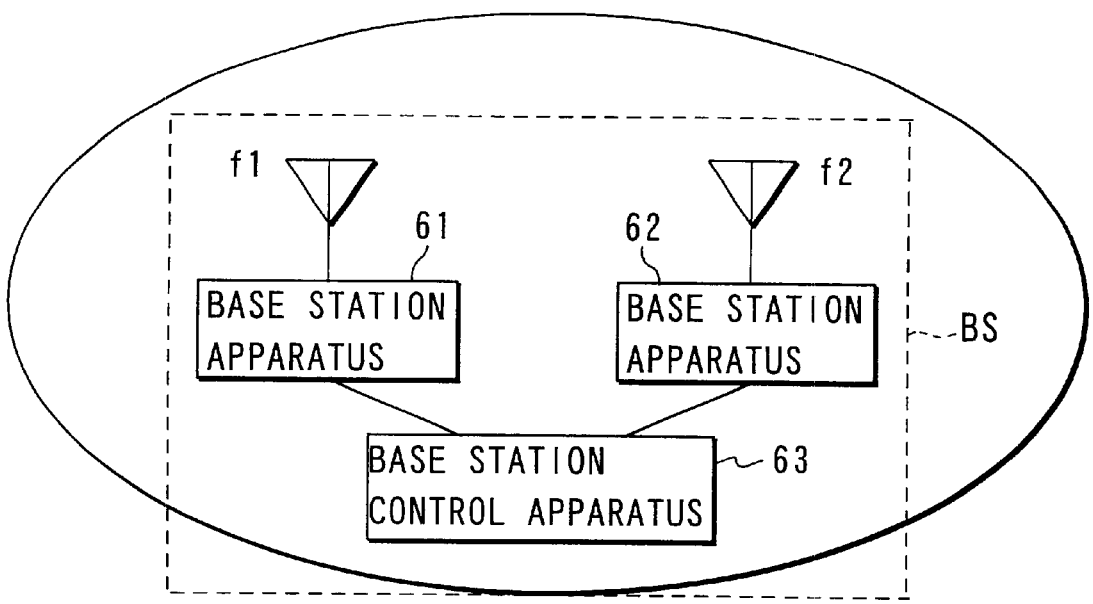

The present invention is not limited to the above embodiment. For example, the above embodiment uses an arrangement like the one shown in FIG. 13(*a*), in which one base station BS handles both radio frequencies (e.g., f1 and f2). However, as shown in FIG. 13(*b*), one base station BS may be made up of a base station apparatus 61 for handling only one (e.g., f1) of the two radio frequencies, a base station apparatus 62 for handling only the other (e.g., f2) of the two radio frequencies, and a base station control apparatus 63 for controlling the two base station apparatuses 61 and 62.

In each embodiment described above, the base stations forms cells having the same diameter. In this case, however, the same diameter includes differences within a predetermined range. The maximum difference is set, for example, such that the diameter of a cell having the maximum diameter is less than twice that of a cell having the minimum diameter.

In addition, the conditions for determining the necessity of idle handoff are not limited to those in the above embodiment. For example, an arbitrary threshold may be set.

The conditions for setting the number of mobile stations to which an idle handoff instruction is to be output are not limited those in the above embodiment, and may be arbitrary set. In addition, the number of mobile stations to which an idle handoff instruction is to be output need not always be variable, and may be constant.

Furthermore, the number of mobile stations to which an idle handoff instruction is to be output may be set in accordance with the channel occupancy of a carrier. In this case, it is preferable that a threshold for determining a channel occupancy be arbitrarily changed by manual operation by a person in charge of maintenance and management in a base station.

The channel occupancy monitoring means 42*a*, the idle handoff controlling means 42*b*, the frequency use state notifying means 42*c*, the handoff method determining means 42*d*, and the network-side handoff control means 42*e*, which are mounted in the base station BS in the above embodiment, may be mounted in the control station CS.

Furthermore, the circuit arrangements of each mobile station and each base station, the control procedures for mobile handoff and idle hard handoff, the contents of the control, and the like can be variously modified within the spirit and scope of the invention.

What is claimed is:

1. A base station apparatus belonging to any one of a plurality of base station groups, forming a cell having a predetermined diameter, and connected to a mobile station over CDMA radio channels of a plurality of radio frequencies allocated to said base station group, characterized by comprising:

channel occupancy monitoring means for monitoring a channel occupancy of each of a plurality of radio frequencies allocated to said self-station; and handoff method determining means for, when said mobile station that has been located in the cell of said self-station moves to a new cell formed by another base station belonging to the same base station group to which said self-station belongs, checking, on the basis of the channel occupancy determined with respect to said base station forming the new cell, whether the channel occupancy of the radio frequency used by said mobile station in the new cell is not less than a predetermined value, and determining soft handoff if the channel occupancy of the radio frequency used by said mobile station in the new cell is less than the predetermined value, and hard handoff if the channel occupancy of the radio frequency used by said mobile station in the new cell is not less than the predetermined value; and network-side handoff control means for performing predetermined handoff control associated with said mobile station by the method determined by said handoff method determining means, and notifying said mobile station of a radio frequency whose channel occupancy in the new cell is not more than a predetermined value, when hard handoff is to be performed.

* * * * *